H. S. MEYER.
ALTERNATING CURRENT ELECTRIC MOTOR.
APPLICATION FILED AUG. 22, 1906.
980,986. Patented Jan. 10, 1911.
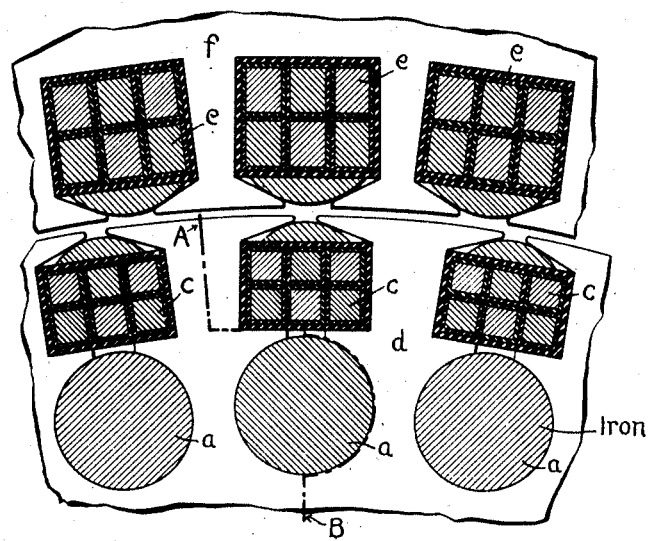
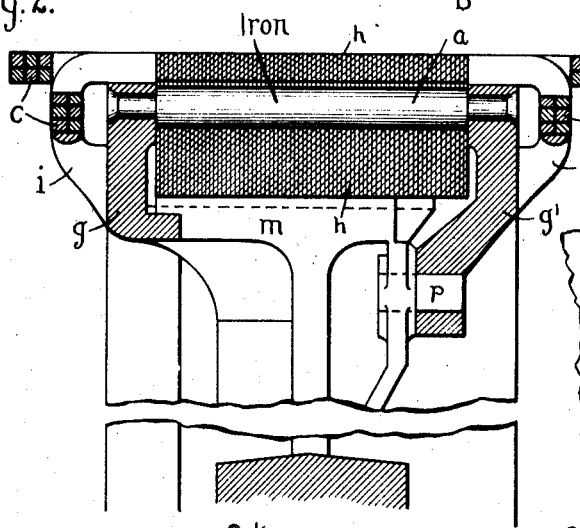
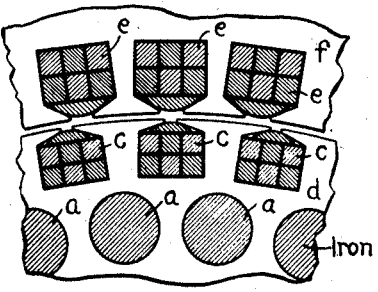
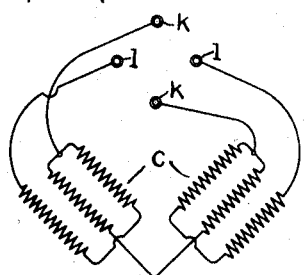
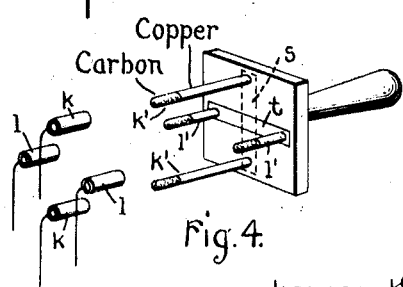
Witnesses
Inventor.
Hans S. Meyer
by Albert H. Davis
Atty.

UNITED STATES PATENT OFFICE.

HANS SIGISMUND MEYER, OF BREMEN, GERMANY, ASSIGNOR TO GENERAL ELECTRIC COMPANY, A CORPORATION OF NEW YORK.

ALTERNATING-CURRENT ELECTRIC MOTOR.

980,986.  Specification of Letters Patent. Patented Jan. 10, 1911.

Application filed August 22, 1906. Serial No. 331,567.

*To all whom it may concern:*

Be it known that I, HANS SIGISMUND MEYER, of 15 König Albert strasse, Bremen, manager, a subject of the Emperor of Germany, residing at Bremen, Germany, have invented certain new and useful Improvements in or Relating to Alternating-Current Electric Motors, of which the following is a specification.

This invention relates to alternating current electric motors of the induction type and more especially to motors of that type in which a starting winding of iron or other magnetic material is arranged in inductive relation to the stator or primary winding.

The object of the invention is to simplify and cheapen the construction of the motor as well as to improve its efficiency by arranging the starting winding in grooves or slots in the secondary core member in the form of bars of magnetic material short-circuited on themselves by suitable means. In addition to the short circuited winding, the rotor is provided with a copper, running winding of ordinary construction. The rotor grooves or slots may communicate at their bottom end with channels, in which the bars of the squirrel-cage winding are tightly fitted so as to form a single slot with two enlarged portions connected by a narrow portion. The ends of the bars may pass through holes in the flanges of the armature spider and may be riveted to the same, the said flanges serving as end rings, and at the same time support and hold together the rotor laminations. The short-circuiting flanges or rings may also be used for supporting the copper winding.

Rotors, having iron squirrel-cage windings only, are well-known. On the other hand, armatures with auxiliary short-circuited windings of high resistance arranged in sections for starting, have also been previously constructed but such auxiliary windings have always been made of copper. The useful cross-section of the iron is, however, decreased by the use of copper bars, and thus the output of the motor is also reduced, for the output approximately corresponds to the number of the lines of force which pass through the rotor, and, therefore, depends on the cross-section of the iron. Unlike well known constructions the use of iron bars according to the present invention enables the cross-section of the armature to be maintained, and moreover, the resistance of the starting auxiliary winding is automatically reduced as the speed increases, owing to a property of magnetic materials, as hereinafter explained. The presence of the winding is also useful electrically when the motor is operating at full speed.

For a better understanding of my invention reference may be had to the following description taken in connection with the accompanying drawing, in which—

Figure 1 is a sectional view of the slots of an induction motor provided with my invention; Fig. 2 is a section of the rotor on the line A—B of Fig. 1; Fig. 3 is a diagrammatical representation of the rotor winding; Fig. 4 a diagrammatical view of a switch for short-circuiting the winding shown in Fig. 3, and Fig. 5 is the sectional view of the slots of an induction motor showing a modification.

Similar reference numerals will be used throughout the specification and the several figures of the drawing to denote like parts.

The magnetic bars $a$ are arranged in the lower portion and the copper winding $c$ in the upper portion of the slots of the rotor $d$. Current is induced in these windings by the winding $e$ of the stator $f$. The bars may be made of iron and fit tightly in their portion of the slots. The bar winding could also be arranged in separate grooves, as shown in Fig. 5. But this latter arrangement would be considerably less advantageous from the electrical point of view, as the self induction of the bar winding would be increased. The laminae $h$ are mounted on the armature spider $m$ and are held in place by the flanges $g$ and $g^1$, into which are also riveted the bars $a$. One of the flanges $g$ may be made integral with the armature spider, while the other $g^1$ is held in place by bolts or rivets $p$. The lateral supporting arms $i$ for the copper winding $c$ are also secured to the flanges $g$ and $g^1$. The flanges can be made either of magnetic or of non-magnetic material.

The dimensions of the bars and of the short-circuiting rings are calculated so that at starting, when the periodicity of the rotor currents is greatest, an apparent resistance is obtained by means of which a good torque is obtained with a starting current approximately equal to the normal load current.

The squirrel-cage winding is designed so as to have low current densities therein, and as no insulating material or soldered joints are used, frequent starting, as well as a temporary use of the squirrel-cage winding alone, cannot do any harm. This simple winding forms the starting resistance, and as the bars $a$ are made of magnetic material and fit exactly into the slots or channels, the existence of these channels does not mean any increase of magnetic resistance. Thus the starting resistance in the rotor body is placed so as to effect the greatest saving of material, without affecting the ventilation or the appearance of the motor. A valuable property, referred to above, of this rotor consists in the automatic alteration of the resistance of the auxiliary winding, owing to the so-called "skin-effect". It is well known that iron bars offer a considerably greater resistance to alternating currents of a large number of periods than to those of a small number, and, therefore, the resistance of the squirrel-cage winding is the greatest at starting and gradually decreases with the increase of speed of the rotor, that is to say, with the decrease of the periodicity of the rotor currents. For a great portion of the starting period there is, therefore, no necessity for having any switching.

In order to increase the efficiency under normal running conditions, in addition to having an iron squirrel-cage winding, a copper, running winding $c$ is employed. The copper winding is gradually cut into circuit after the motor has reached about ⅔ of its normal speed, and in this case as it is only a question of increasing the speed by about 30%, 2 or 3 sections will be sufficient in order to prevent heavy rushes of current. Were it not for the automatic variation of the resistance of the iron squirrel-cage winding and the consequently higher speed attained, a greater number of sections of the copper winding would have been required. This renders a very compact and simple construction of the starting switch for the copper winding possible. Since there is very litle liability to sparking at the points of contact, the switch can easily be inclosed, so that the motor can be used without any further alterations, even in places exposed to risk of fire. The contact points can be constructed in such a manner that the current passes first from metal to carbon, and then only to metal which, on the one hand, contributes to further graduation of the starting current, and also renders any sparking that might take place inside the switch box harmless.

During the normal operation of the motor, that is to say, after the whole of the copper winding has been short-circuited, the rotor currents become divided, in the proportion of the apparent resistances, between the iron and the copper windings, and in that way the efficiency of the motor is increased during the whole operating period, as the squirrel-cage winding is in parallel with the copper winding and thus contributes to the decrease of slip. In itself, the copper winding could also be a squirrel-cage winding, but, as is well known, that increases the weight of the mechanical device for switching-in sections. For that reason a so-called "phase" winding has been selected, which, as shown in Fig. 3, is a two-phase winding having two sections per phase with a grounded neutral point. The first section of the copper winding $c$, of Fig. 3, which is to be short-circuited, is brought to the terminals $k$, and the whole winding is included between the terminals $l$. The long terminals $k^1$ of the switch shown in Fig. 4 are short-circuited by means of the metal strap $s$, shown in dotted lines, and the short terminals $l^1$ are short-circuited by the metal strip $t$, shown in full lines. The tips of the terminals $k^1$ and $l^1$ may be made of carbon, as indicated in the drawing. By inserting the switch a short distance into the terminals of the winding so that only the carbon tips make contact, the first section of the winding is short-circuited through the terminal $k$, the switch terminal $k^1$, the metal bar $s$, the other switch terminal $k^1$, and finally through the other winding terminal $k$. The winding terminals are hollow and permit the switch terminals to pass through them, so that by pushing the switch in farther the short-circuit is made better by the copper parts of the switch terminals. A still further movement of the switch brings the winding terminals $l$ into contact with the carbon tips of the switch terminals $l^1$, and the whole winding is short-circuited by the metal strip $t$, in addition to the short-circuit of the first section of the winding. The final position of the switch brings the winding terminals $l$ into contact with the copper part of the switch terminals $l^1$, and the short-circuit is complete. The squirrel-cage winding, consisting of iron bars, serves, therefore, not only as an indestructible starting resistance, but also is of great use mechanically, electrically and magnetically during the whole period of operation of the motor.

What I claim as new and desire to secure by Letters Patent of the United States, is,—

1. In an induction motor, a rotor having laminations, said laminations having slots therein, a copper winding distributed in said slots in the periphery of the rotor, means for short-circuiting said copper winding when said motor attains speed, and bars of magnetic material extending through said laminations and suitably connected together to form a short-circuited winding.

2. In an induction motor, a rotor having laminations, said laminations having slots therein, a running winding distributed in said slots in the periphery of the rotor, and bars of magnetic material extending through said laminations, said bars being located in the laminations below the slots and suitably connected together to form a short-circuited starting winding.

3. In an induction motor, a rotor having laminations, said laminations having slots therein, a winding distributed in said slots in the periphery of the rotor, means for short-circuiting said winding when the motor attains speed, and bars of magnetic material extending through said laminations, said bars being located in the laminations below the slots and suitably connected together to form a short-circuited starting winding.

4. In an induction motor, a rotor having a spider, laminations mounted thereon, flanges clamping said laminations, said laminations having slots, said slots having an enlarged top portion and an enlarged bottom portion, a winding in said top portion, bars of magnetic material fitting tightly in said bottom portion and being secured in said flanges so as to form a squirrel-cage winding.

5. In an induction motor, a rotor built up of laminations, said laminations having slots, bars of magnetic material in the bottom of said slots forming a squirrel-cage winding, a copper winding in the top of said slots, and means for short-circuiting said copper winding when the motor attains speed, said bars of magnetic material fitting tightly in the slots.

6. In an induction motor, a rotor built up of laminations, said laminations having slots, bars of magnetic material in the bottom of said slots forming a squirrel-cage winding, a copper winding in the top of said slots and means for short-circuiting said copper winding when the motor attains speed, said bars of magnetic material being substantially surrounded by iron.

Signed by me at Bremen, Germany, this twentieth day of July 1906.

HANS SIGISMUND MEYER.

Witnesses:
C. DIEDERICH,
J. REICH.